Sept. 23, 1969 K. L. PAAPE 3,469,149
INSULATED BUS BAR ASSEMBLY FOR AN ELECTRICAL ENCLOSURE
Filed Dec. 11, 1967 2 Sheets-Sheet 1

INVENTOR.
KENNETH L. PAAPE
BY
*William H. Schmeling*

INVENTOR.
KENNETH L. PAAPE
BY
William H. Schmeling

United States Patent Office 3,469,149
Patented Sept. 23, 1969

1

3,469,149
INSULATED BUS BAR ASSEMBLY FOR AN
ELECTRICAL ENCLOSURE
Kenneth L. Paape, Mequon, Wis., assignor to Square D
Company, Park Ridge, Ill., a corporation of Michigan
Filed Dec. 11, 1967, Ser. No. 689,537
Int. Cl. H02b 1/08
U.S. Cl. 317—120                               8 Claims

ABSTRACT OF THE DISCLOSURE

An insulated vertical bus bar assembly for an electrical control center wherein the vertical bus bars are supported against horizontal movement by vertically spaced horizontal insulators and encased by sheet-like insulating members which are removably positioned between two vertically adjacent insulators by sockets in the insulators.

Background of the invention

This invention relates to electrical apparatus and more particularly to an insulated bus bar assembly in a multi-compartment electrical apparatus cabinet.

Devices which are used to control the distribution of electric current to a plurality of electric loads, such as a number of motors from a central location, frequently are housed in compartmented structures called control centers and as occasionally the systems may require modification and the devices such as relays, motor starters and contactors may require service or replacement, control centers frequently are formed of a group of individual cabinets each of which includes a plurality of cells or compartments wherein the devices are installed. To facilitate wiring and servicing, control centers are provided with main horizontal bus bars which extend across the upper portions of all of the individual cabinets and which are connected to deliver current from a supply to groups of individual vertical bus bars in each cabinet. The vertical bus bars in turn deliver current to the devices within the individual cells through separable plug-in connectors which make contact with the vertical bus bars. Thus the vertical bus bars must be rigidly supported to not only withstand the plug-in operation when the devices are removed or installed in the cabinet but also the severe electromechanical stresses induced by the high currents which may develop in the bus bars under short circuit conditions. One method conventionally used to prevent distortion of the vertical bus bars by the high currents and the plugging-operation is to brace the bus bars with horizontal insulating supports that are vertically spaced at intervals depending upon the capacity of the electric supply to the control center. While the arrangement using horizontal insulators has proved to be satisfactory, in that it provided adequate mechanical support for the vertical bus bars, it is objectionable in that it exposes the portions of the bus bars extending between the insulators. Recognizing that the exposed portions of the vertical bus bars could be accidentally contacted by persons servicing the devices within the cabinets, control centers have been constructed with the bus bars totally encased in insulated covers that extend throughout the full length of the bus bars with the insulated covering supported at spaced vertical intervals to provide the necessary mechanical support for the bus bars. However, many control centers do not require insulated covering for the bus bars and other control centers require insulating covering for the bus bars only in areas which present a safety problem. Thus the structures heretofore known either required that insulated coverings for the vertical bus bars be provided when not required or that the stuctures could not be changed to include insulated coverings for the bus bars without disassembling the entire cabinet structure when the structure originally was constructed without insulated coverings for the bus bars.

Summary

Accordingly, it is an object of the present invention to provide an insulated bus bar assembly in a multi-compartment electrical apparatus cabinet which will provide adequate mechanical support for the bus bars and a covering for the bus bars which may be removed or installed without disturbing the mechanical supports for the bus bars.

Another object is to provide an insulated bus bar assembly in a multi-compartment electrical apparatus cabinet which will accommodate plug-in connections between the devices and the bus bars and includes a group of mutually spaced vertically extending bus bars which are supported against horizontal movement by vertically spaced insulators and covered by formed insulating sheets that are maintained in position in the cabinet by the insulators so that the sheets can be omitted, installed or removed from the cabinet without changing or disturbing the bus bars or the supporting insulators.

A further object is to cover the vertical bus bars in a multi-compartment cabinet for electric apparatus with sheets of formed insulating material that are positioned in the cabinet by horizontal insulator supports for the bus bars so that either or both sides of any or all vertical lengths of the bus bars are covered.

Further objects and features of the invention will be readily apparent to those skilled in the art from the specification and appended drawing illustrating certain preferred embodiments, in which.

Figure 1:
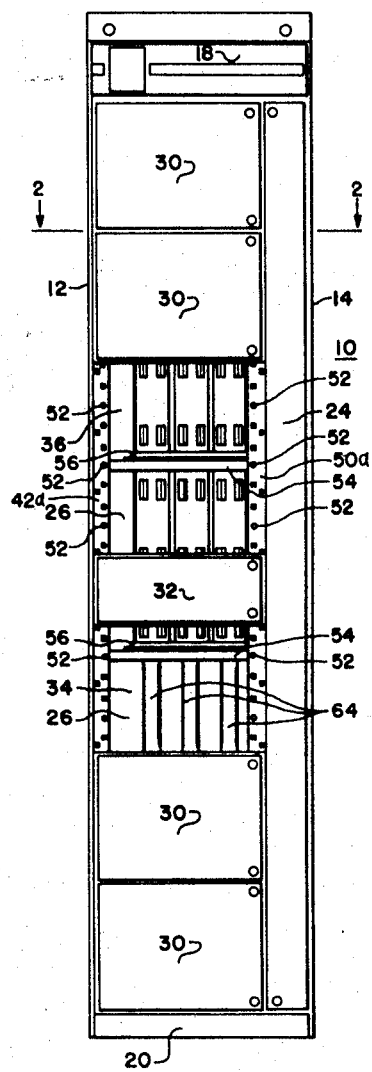
FIG. 1 is a front elevational plan view of an electrical apparatus cabinet incorporating the features of the present invention.
Figure 2:
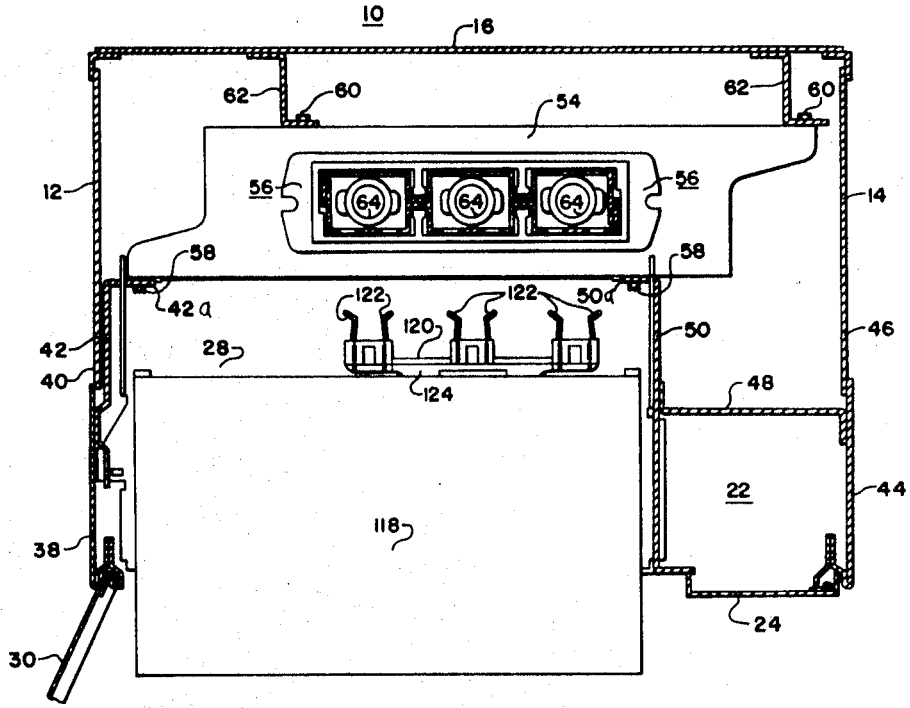
FIG. 2 is a cross sectional view taken along line 2—2 in FIG. 1 showing a portion of an open door for the cabinet and a housing for electrical devices detached from its plug-in connection with the bus bar assembly.

Referring to the drawings, and particularly to FIGS. 1 and 2, a vertical section of a multi-compartment electrical apparatus cabinet 10 is also illustrated in an application for United States Patent having a Ser. No. D. 9,730, concurrently filed herewith. Also, as disclosed in an application for United States patent having a Ser. No. 689,412, concurrently filed herewith, the cabinet 10 has a pair of sidewalls 12 and 14, a rear wall 16, a horizontal wiring trough at the upper portion of the cabinet 10 which is closed by a cover 18, a horizontal wiring trough at the lower portion of the cabinet 10 which is concealed by a member 20, a vertically extending wire trough 22 closed by a door 24, and an elongated vertical opening 26 extending between the cover 18 and the member 20. The vertical opening 26 is divided into a selected number of vertically stacked compartments or cells by unit mounting pans 28. The cells each have a height equal to a whole number multiple of a unit dimension which is determined in a manner disclosed in Ser. No. 689,412, and have an open front which is closed by covers or doors. In FIG. 1 the cabinet 10 is shown as having seven vertically stacked cells four of which are closed by doors indicated by a numeral 30, one of which is closed by a door indicated by a numeral 32 and two exposed cells respectively indicated by numerals 34 and 36. The cells closed by the doors 30 as well as the exposed cell 34 are two units high, the cell closed by the door 32 is one unit high and the cell 36 is three units high.

The sidewall 12 is formed of an assembly of parts including members 38, 40 and 42. Similarly, the sidewall 14 including the walls of the wire trough 22 is formed of an assembly of parts including members 44, 46, 48 and 50. The members 42 and 50 support the unit mounting pans 28 and have inwardly turned continuously extending vertical flanges 42a and 50a on their rear edges. The flanges 42a and 50a have a plurality of openings 52 therein which are used to secure supports 54 for horizontally extending insulators 56 at a plurality of vertically spaced locations. The openings 52 are spaced apart a distance designated as unit space and therefore the supports 54 and insulators 56 may be spaced a unit space apart or whole number multiples thereof, depending upon the magnitude of the expected mechanical stresses which may be induced in the vertical bus bars under short circuit conditions. The supports 54 are positioned on the flanges 42a and 50a by screws 58 which extend through the openings 52 and by screws 60 which extend through suitably located openings in a pair of support members 62 secured to the rear wall 16.

Figure 3:
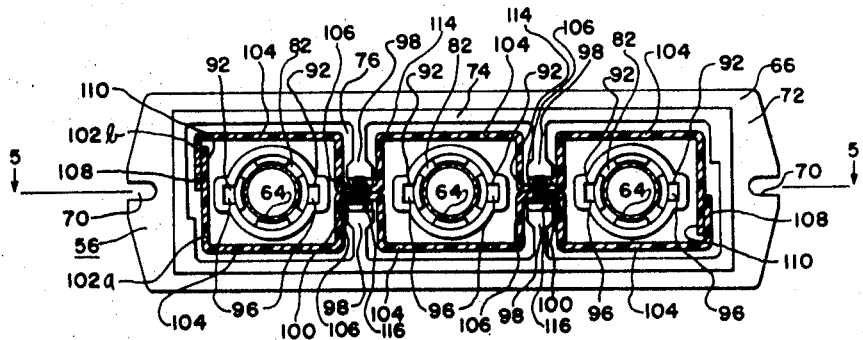
FIG. 3 is a plan view on an enlarged scale of the horizontal insulator support and the insulating covering for the vertical bus bar shown in FIG. 2.
Figure 5:
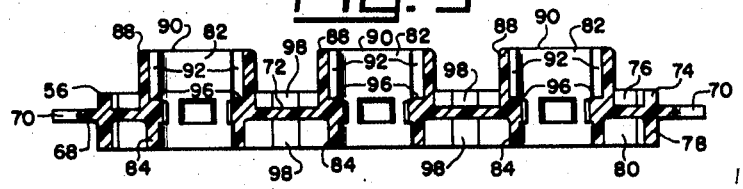
FIG. 5 is a cross sectional view of a horizontal bus bar insulator taken along line 5—5 in FIG. 3.

The cabinet 10 additionally includes a plurality of horizontal bus bars, not shown, extending across the upper portion of the cabinet rearwardly of a vertical plane through the flanges 42a and 50a. Secured to the horizontal bus bars so as to be vertically supported thereby is a group of three vertically extending bus bars 64. The supports 54 each have a rectangular opening through which a portion of the insulators 56 extend. As shown in FIGS. 3 and 5, each insulator 56 is formed of suitably rigid molded insulating material to have a substantially rectangular mounting portion 66. The portion 66 has a length and width greater than the openings in the supports 54 so a bottom face or surface 68 on the portion 66 rests on the support 54. The opposite ends of the mounting portion 66 are provided with screw receiving openings 70 to secure the insulators 56 to the supports 54. Extending upwardly from a top surface 72 of the portion 66 is a raised rib 74 that extends to provide a border for a rectangularly shaped socket 76 on the top surface 72. Similarly extending downwardly from the bottom surface 68 is a raised rib 78 that extends to provide a border for a rectangularly shaped socket 80 on the bottom surface 68. Preferably the rib 78 has a height twice as great as the rib 74 so that the depth of the socket 80 is twice that of the socket 76. Extending between the top surface 72 and the bottom surface 68 are three spaced openings 82 each of which has a bus bar 64 extending therethrough to prevent horizontal movements of the bus bars 64 relative to each other. Surrounding each of the openings 82 and extending downwardly from the bottom surface 68 is a cylindrical annulus 84 having a free end disposed in a plane defined by a bottom edge of the rib 78. Similarly extending upwardly of the top surface 72 are annuli 88 each surrounding one of the openings 82. The annuli 88 have a top edge 90 extending in a plane that is spaced above the top edges of the rib 74 and a pair of downwardly extending grooves 92 in opposite inner sidewall portions to provide a ledge 96 on opposite sides of each opening 82. Additionally extending inwardly on both the top surface 72 and the bottom surface 68 from opposite sides of the ribs 74 and 78 on opposite sides of the central one of the three openings 82 are pairs of raised rib portions 98 having free ends spaced to provide spaces 100 therebetween. The rib portions 98 preferably have heights equal to the ribs 78 and 74 from which they extend.

The means for isolating the portions of the bus bars 64 that are exposed between adjacent vertically spaced insulators 56 from accidental contact are provided by barriers 102a and 102b. The barriers 102a and 102b are identical and may be formed of insulating material as an extrusion, by vacuum forming, by conventional molding methods and or the like to have a uniform thickness and a group of vertically extending channels 104 which are separated by indented portions 106 so that each pair of channels 104 receives and completely encloses a vertical bus bar 64 when the two barriers 102a and 102b are positioned to face in opposite directions on opposite sides of the bus bars 64, as in FIGS. 3 and 4, with the indented portions 106 on the respective barriers 102a and 102b in mutual engagement.

The barriers 102a and 102b are formed to have end wall portions thereof, indicated by the numerals 108 and 110, overlap when the barriers 102a and 102b are positioned to enclose the bus bars 64 and if desired, the thickness of the rib 74 may be increased in the area where the end walls 108 and 110 are not overlapped to aid in positioning the barriers 102a and 102b on the insulators 56.

Each of the channels 104 has a pair of spaced openings 112 located at one unit space intervals. Thus if the barriers 102a and 102b are to be received between a pair of insulators 56 that are one unit space apart, the channels 104 each will have one pair of openings 112. If the barriers 102a and 102b are to be received between a pair of insulators 56 spaced two unit spaces apart, the channels 104 each will have two pairs of openings 112 with the openings 112 of the respective pairs being vertically spaced one unit space apart. Similarly, if the barriers 102a and 102b are to be received between a pair of insulators 56 spaced three unit spaces apart, the channels 104 each will have three pairs of openings 112 with the openings 112 of the respective pairs being vertically spaced one unit space apart, and if the barriers 102a and 102b are to be received between a pair of insulators 56 spaced four unit spaces apart, the channels 104 each will have four pairs of openings 112 with the openings 112 of the respective pairs being vertically spaced one unit space apart.

As previously stated, the rib 78 has a height twice that of rib 74 and the socket 80 has a depth twice that of socket 76. The barriers 102a and 102b are sized to have a height greater than the height between the ribs 74 and 78 on the vertically adjacent insulators 56 between which the barriers 102a and 102b are to be installed and less than the height between the confronting surfaces 68 and 72 of the vertically adjacent insulators 56. Thus all that is required to install the barriers 102a and 102b between two vertically spaced insulators 56 is to position the upper edge of the barriers 102a and 102b in the downwardly facing socket 80 on the upper of the two insulators 56 and to pass the lower edge of the barrier over the rib 74 on the lower of the two insulators 56 into position in the socket 76. When the barriers 102a and 102b are thus positioned, all that is required is to lower the barriers 102a and 102b into the lower socket 76 to a position where the ribs 74 and 78 on the pair of insulators will maintain the barriers 102a and 102b in position. When the barriers 102a and 102b are thus positioned in the sockets 76 and 80, the space between the outer surface of the annuli 84 and 88 and the ribs 74 and 78 will maintain the barriers 102a and 102b in position. Additionally, the indented portions 106 will extend in the space 100 and surround the rib portions 98 so that the indented portion 106 will also be properly positioned by the insulators 56. The barriers 102a and 102b also are provided with suitably located openings 114 through which suitable fasteners 116 may be passed to secure the indented portions 106 of the barriers 102a and 102b together. The fasteners 116 are principally provided to maintain the barriers in proper position during shipment of the cabinets 10. Removal of the barriers 102a and 102b from the cabinet 10 is accomplished by removing the fasteners 116, if any be present, and vertically moving the barriers 102a and 102b upwardly into the socket 80 so the lower edge of the barriers 102a and 102b may pass over the rib 74. The lower edges of the barriers 102a and 102b are then moved outwardly of the socket 76 so that the upper edge of the barriers 102a and 102b may be disengaged from the sockets 80.

Figure 4:
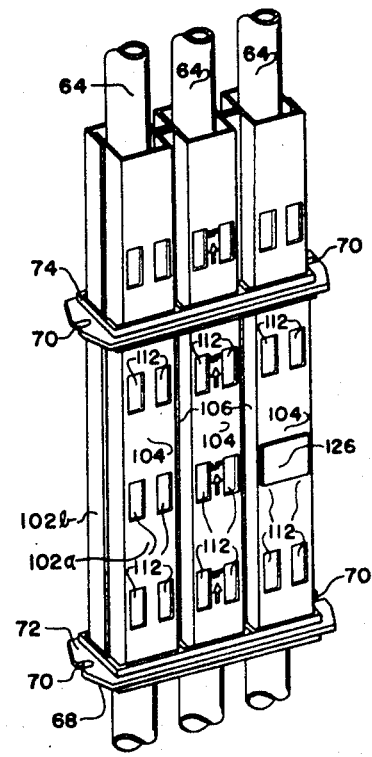
FIG. 4 is a perspective view of the bus bar assembly removed from the cabinet in FIG. 1 and with some portions broken away and others in section.

As previously stated, each of the channels 104 has pairs of openings 112 vertically spaced at one unit space intervals. Thus if the interval between supports 54 is one space unit high a single pair of openings 112 will be provided in each channel 104. As a cell may be a multiple of a single unit, multiple pairs of openings 112 may be accessible in each of the cells. Insertable into each of the cells is a support 118 which carries switching devices, not shown, such as relays, manually operated switches, and the like. The devices carried by the supports 118 are electrically connected to a plug-in connector 120 carried on the rear wall of the support 118. The plug-in connectors 120 are positioned relative to the openings 112 so that the spring biased jaws 122 carried by an insulated member 124 of the connector may pass through the openings 112 to engage the vertical bus bars to make electrical connection therewith. The unused openings 112 may be concealed by covers 126, one of which is illustrated in FIG. 4. The covers 126 are preferably formed of suitable insulating material and have resilient fingers which engage the walls of the barriers 102a and 102b surrounding the opening 112 to secure the covers 126 into position. Additionally, in certain installations it may not be necessary to cover the rear portions of the bus bars 64. Thus if not required, the barriers 102b may be eliminated. When this arrangement is used the barrier 102a will be maintained in position between the two vertically spaced insulators 56, as previously described.

As previously stated, the insulators 56 have grooves 92 extending to a ledge 96 on opposite side walls of the annuli 88. In some installations it may be required to insert units into the cell that have a depth greater than the depth between the flanges 42a and 50a on the front portion of the cabinet 10 which requires an interrupted vertical bus bar arrangement wherein an upper set of vertical bus bars 64 may be vertically spaced from a lower set of bus bars 64 and electrically connected thereto by suitable wire leads. When an interrupted vertical bus bar arrangement, which is not shown, is used, the lower set of bus bars are vertically maintained by suitable pins which extend from the bus bars and are received in the grooves 92. When this arrangement is used, both the lower and the upper sets of bars may be provided with insulating barriers, as heretofore described.

What is claimed is:

1. An insulated bus bar assembly in a multi-compartment electrical apparatus cabinet comprising: a group of mutually spaced vertically extending bus bars, a plurality of horizontally extending vertically spaced insulators, each of said insulators having: a top surface, an upwardly facing socket on the top surface, a bottom surface, a downwardly facing socket on the bottom surface, and a group of mutually spaced openings extending between the top and bottom surfaces with each opening of the group having a bus bar extending therethrough whereby the insulator maintains the bus bars of the group against horizontal movement relative to each other, and a barrier of insulating material positioned adjacent a portion of the group of bus bars that extends between two vertically adjacent insulators, said barrier having an upper end positioned in the downwardly facing socket of an upper one of the two adjacent insulators, a lower end positioned in the upwardly facing socket of a lower one of the two adjacent insulators and a group of vertically extending mutually spaced channels receiving the portions of the bus bar group for preventing contact with the portions of the bus bar group when the barrier is positioned by the sockets on the upper and lower insulators.

2. The combination as recited in claim 1 wherein each of the channels has an opening therein for passage of means for making an electrical connection with a surface area of the bus bar within the channel.

3. The combination as recited in claim 1 wherein the upwardly facing and the downwardly facing sockets each have a bottom wall and the downwardly facing socket has a depth greater than the upwardly facing socket and the barrier has a length less than a distance between the bottom walls of the upwardly facing and the downwardly facing sockets whereby the barrier can be removed and installed in its position within the sockets by raising the barrier to a position wherein its upper end engages a bottom wall of the downwardly facing socket while its lower end is disengaged from the upwardly facing socket.

4. An insulated bus bar assembly in a multi-compartment electrical apparatus cabinet comprising: a group of mutually spaced vertically extending bus bars, a plurality of horizontally extending vertically spaced insulators, each of said insulators having: a top surface, an upwardly facing socket on the top surface, a bottom surface, a downwardly facing socket on the bottom surface, and a group of mutually spaced openings extending between the top and bottom surfaces with each opening of the group having a bus bar extending therethrough for maintaining the bus bars of the group against horizontal movement relative to each other, and a pair of identical oppositely facing barriers of insulating material positioned on opposite sides of portions of the group of bus bars that extends between two vertically adjacent insulators, each of said barriers having an upper end positioned in a downwardly facing socket of an upper one of the two adjacent insulators, a lower end positioned in the upwardly facing socket of a lower one of the two adjacent insulators, and a group of vertically extending mutually spaced channels separated by indentations providing an enclosure for the portions of the bus bars for preventing accidental contact with the bus bar portions when the pair of barriers are positioned by the insulators on opposite sides of the bus bars.

5. The combination as recited in claim 4 including indented portions on each barrier separating the spaced channels and separate fastening means extending through openings in the indented portions of the two barriers for maintaining the indented portions of the two barriers in mutual engagement with each other.

6. The combination as recited in claim 5 wherein the upwardly facing socket and the downwardly facing sockets each have ribs extending into a space between the channels.

7. The combination as recited in claim 5 wherein the two barriers have mutually overlapping edges when the indented portions of the two barriers are in mutual engagement.

8. The combination as recited in claim 4 wherein each of the channels in the barriers has spaced openings therein for passage of means for making electrical connections with the bus bars enclosed by the channels.

References Cited

UNITED STATES PATENTS

| | | | |
|---|---|---|---|
| 3,041,506 | 6/1962 | Schlessel et al. | 317—120 |
| 3,113,820 | 12/1963 | Norden. | |
| 3,170,092 | 2/1965 | Adams et al. | |
| 3,346,776 | 10/1967 | Olashaw | 317—117 |

FOREIGN PATENTS 108,009   7/1967   Denmark.

LARAMIE E. ASKIN, Primary Examiner

U.S. Cl. X.R.

174—100